Patented Aug. 25, 1936

2,051,873

UNITED STATES PATENT OFFICE 2,051,873

TREATMENT OF MOTOR FUEL

Charles D. Lowry, Jr., Chicago, Ill., assignor to Universal Oil Products Company, Chicago, Ill., a corporation of Delaware No Drawing. Application April 30, 1934, Serial No. 723,182

7 Claims. (Cl. 44—9)

This invention relates more particularly to the treatment of motor fuel fractions produced in the cracking of petroleum.

In a more specific sense it is concerned with the use of small quantities of specific anti-oxidants or inhibitors to retard the deterioration in properties of cracked gasolines which are ordinarily suffered under average storage conditions prevailing in refineries. A further feature of the invention, which will be developed more in detail in the following specification, comprises the use of a material which indicates the partial or complete consumption of the inhibitor by a color change so that the extent of deterioration of the inhibited gasoline is readily determined at any period in its storage.

The art of using inhibitors to retard or substantially prevent deterioration in properties of cracked gasolines during their normal storage period prior to their sale is a relatively recent development in the petroleum refining art and the discovery of materials which are effective for this purpose has to a large extent eliminated the necessity for extensive chemical refining of petroleum distillates and at the same time conserved valuable material. In the older and more customary methods of treatment primary cracked naphthas were treated with sulphuric acid of commercial strength, the sludge separated, the distillate neutralized and subjected to a carefully run steam distillation to produce an end-point gasoline. Sulfuric acid is not entirely selective in its action upon the more highly unsaturated olefins and sulfur compounds and tends to either dissolve or polymerize some mono-olefins which are valuable as anti-knock constituents when sufficient quantities of acid are used to effect a substantial sulfur reduction.

When raw or partly treated cracked gasolines are stored they frequently deteriorate in respect to color, gum content and anti-knock value. The chemical reactions involved in these changes are evidently due to the polymerization of diolefins of a conjugated character to form gummy and resinous materials which ultimately precipitate and deposit in fuel feed lines and carburetors and on valve stems to seriously hinder the operation of internal combustion engines. The loss in anti-knock value is probably due to actual lessening of gasoline boiling range material and also to the presence of peroxides of olefins in solution in the gasoline, which accelerate the reactions of combustion in the engine cylinder.

To overcome the tendency of cracked gasolines to lose their valuable properties on storage a large number of special chemical compounds and semi-refined products have been tried.

In one specific embodiment the present invention comprises the use of p-nitrophenylazo-pyrogallol as inhibitor, dye and indicator in unstable gasolines.

The preferred inhibiting material, according to the concept of the present invention, is an oil soluble dye imparting a yellow to brown color to gasolines, depending upon the quantities used in solution. Approximately 0.002 to 2%, more or less, may be added. The following description is given of the manufacture of this compound to assist in developing its chemical structure and its properties.

The compound whose use constitutes the subject matter of the present invention was prepared as follows: 13.8 parts by weight of nitro-aniline were dissolved in aqueous hydrochloric acid made by adding 20.7 volumes of concentrated hydrochloric acid to 100 volumes of water. The compound was rapidly diazotized by adding a concentrated aqueous solution containing 7 parts by weight of sodium nitrite. To the solution containing the diazonium salt a solution of 13.2 parts by weight of pyrogallol in 50 volumes of water was added and following this 25 parts by weight of sodium carbonate dissolved in 100 volumes of water. The reaction mixture was allowed to stand for 12 hours after which 52 volumes of strong acetic acid was added to precipitate the dye, which was then filtered. The compound thus produced had a yellowish brown color, was slightly soluble in benzol and easily soluble in alcohol. It appears to have two probable structures as follows:

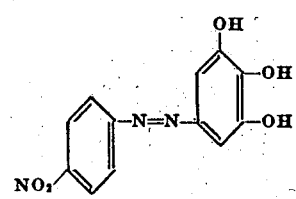

The compound prepared as above is believed to be novel as no data on its preparation or properties have been found in the chemical literature.

The material prepared in the above described manner is sufficiently soluble in gasolines to give them a pleasing golden-yellow color for sales purposes and also to substantially retard their deterioration under storage conditions. It functions to arrest the oxidation reactions which ordinarily start the deterioration of cracked gasolines by preferentially absorbing oxygen and in so doing becomes gradually consumed and decolorized. However, tests both in the oxygen bomb and in storage have shown that when proper quantities are used there is very little loss in color for a considerable period, so that gasolines in which it is used show a uniform tint for the ordinary periods of storage encountered in the course of the distribution of motor fuel. The exhaustion of the inhibitor is first evidenced by a lightening of color which quickly goes through a light yellow stage and then disappears completely. The appearance of the light yellow color is an indication that more inhibitor is needed.

By the use of the inhibitor of the present invention in 0.01% concentration in an unstable cracked gasoline having an induction period in the standardized oxygen bomb test of 130 minutes, the induction period was raised to 555 minutes, a value well in excess of the 240 minutes commonly required in gasolines which are sufficiently stable under average refinery and sales distributing plant conditions.

The novelty and utility of the process of the present invention are obvious from a consideration of the preceding specification and single instance of numerical data showing practical results, but neither is to be considered as unduly limiting its scope.

I claim as my invention:

1. A process for the treatment of cracked hydrocarbon oil of substantially motor fuel boiling range to retard deterioration of the same in respect to gum formation and anti-knock value, which comprises adding thereto a paranitrophenylazopyrogallol, which imparts color to the hydrocarbon oil, the process being further characterized by loss in color of the hydrocarbon oil as deterioration progresses.

2. A process for the treatment of cracked hydrocarbon oil of substantially motor fuel boiling range to retard deterioration of the same in respect to gum formation and anti-knock value, which comprises adding thereto a small amount of paranitrophenylazopyrogallol, which imparts color to the hydrocarbon oil, the process being further characterized by loss in color of the hydrocarbon oil as deterioration progresses.

3. A process for the treatment of cracked hydrocarbon oil of substantially motor fuel boiling range to retard deterioration of the same in respect to gum formation and anti-knock value, which comprises adding thereto from 0.002 to 2% of paranitrophenylazopyrogallol, which imparts color to the hydrocarbon oil, the process being further characterized by loss in color of the hydrocarbon oil as deterioration progresses.

4. Cracked hydrocarbon oil of substantially motor fuel range containing a relatively small amount of paranitrophenylazopyrogallol to retard deterioration of said oil in respect to gum formation and anti-knock value.

5. Cracked hydrocarbon oil of substantially motor fuel range containing from 0.002 to 2 percent of paranitrophenylazopyrogallol to retard deterioration of said oil in respect to gum formation and anti-knock value.

6. A method of treating gasoline containing gum-forming constituents which comprises adding thereto a relatively small amount of paranitrophenylazopyrogallol.

7. Motor fuel comprising gasoline containing gum-forming constituents and a relatively small amount of paranitrophenylazopyrogallol.

CHARLES D. LOWRY, Jr.